United States Patent
Allen

(10) Patent No.: US 11,204,099 B2
(45) Date of Patent: Dec. 21, 2021

(54) SEAL

(71) Applicant: Aktiebolaget SKF, Gothenburg (SE)

(72) Inventor: Warrick Allen, Hilversum (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/513,937

(22) Filed: Jul. 17, 2019

(65) Prior Publication Data
US 2020/0032909 A1 Jan. 30, 2020

(30) Foreign Application Priority Data

Jul. 26, 2018 (DE) .......................... 102018212502.3

(51) Int. Cl.
*F16J 15/3232* (2016.01)

(52) U.S. Cl.
CPC ................. *F16J 15/3232* (2013.01)

(58) Field of Classification Search
CPC ...... F16J 15/32; F16J 15/3204; F16J 15/3232; F16J 15/324; F16C 33/60; F16C 33/768; F16C 33/726; F16C 19/388; F16C 19/525
See application file for complete search history.

(56) References Cited

U.S. PATENT DOCUMENTS

| | | | |
|---|---|---|---|
| 3,671,048 A * | 6/1972 | Gyory | F16J 15/324 277/569 |
| 6,457,870 B2 | 10/2002 | Aizawa et al. | |
| 9,121,505 B2 | 9/2015 | Kurth | |
| 2007/0246895 A1 | 10/2007 | Pavan | |
| 2008/0311337 A1 | 12/2008 | Veinot | |
| 2012/0001395 A1 | 1/2012 | Kurth | |
| 2017/0292608 A1* | 10/2017 | Barbera | F16J 15/324 |

FOREIGN PATENT DOCUMENTS

WO  2011/141299 A1  11/2011

OTHER PUBLICATIONS

Geoff R. Willmott, Chiara Neto and Shaun C. Hendy; "Uptake of Water Droplets by Nonwetting Capillaries"; arXiv:1002.0598v1 [physics.flu-dyn] Feb. 2, 2010.

* cited by examiner

*Primary Examiner* — Gilbert Y Lee
(74) *Attorney, Agent, or Firm* — Garcia-Zamor Intellectual Property Law; Ruy Garcia-Zamor; Bryan Peckjian

(57) ABSTRACT

A seal that enables an enclosure to be sealed and to keep an air pressure balance between an internal space within the enclosure and an external space outside the enclosure in such a way that water ingress into the enclosure is hindered in a predictable manner. This is accomplished by providing a seal having at least one small diameter tube with at least an inner surface being hydrophobic, oleophobic or omniphobic. The seal is mounted in the enclosure between the inner and outer space. To further avoid small particle contaminants to enter and go through the at least one small diameter tube, it is preferable to have a small diameter tube with curves and bends, and it will still allow an airflow through it if there is an air pressure imbalance.

10 Claims, 2 Drawing Sheets

SEAL

CROSS-REFERENCE TO RELATED APPLICATIONS

This application claims priority to Italian patent application no. 102018212502.3 filed on Jul. 26, 2018, the contents of which are fully incorporated herein by reference.

FIELD OF THE INVENTION

The invention concerns seals and is more particularly directed to frictional seals protecting machine parts such as rolling element bearings from water and other external contaminants.

BACKGROUND OF THE INVENTION

One example of a machine part is a rolling element bearing. A rolling element bearing comprises an inner ring, an outer ring and several rolling elements or bodies installed between these two rings. These rolling elements can be balls, rollers or needles. In the meaning of the invention, a rolling bearing and a rolling element bearing can be, for instance, a ball bearing, a roller bearing or a needle bearing. Many rolling element bearings are hermetically sealed to keep lubrication inside the bearing space and to prevent contaminants and fluids such as water, from entering the bearing space.

A rolling element bearing will heat up during operation, the higher the number of revolutions per minute (RPM), the warmer it will become, thus heating up the air in the bearing space, which results in a higher pressure in the bearing space than outside the bearing space. This will put pressure on an elastomeric seal and seal lip to bend outwards from the bearing space, which at first will cause the seal lip to get unpredictable uneven wear and eventually oil/grease leakage when the heated air in the bearing space starts to escape. The pressure difference between the air pressure of the bearing space in relation to that of the outside will become smaller due to the escape of air from the bearing space, but not completely disappear, resulting in a continuous pressure on the elastomeric seal. When the RPM decreases, or it stops completely, the bearing will cool down, the air in the bearing space will cool down and decrease in volume thus creating a negative pressure within the bearing space in relation to the air pressure outside of the bearing space. This will create an external pressure on the elastomeric seal to bend inwards into the bearing space, which will cause to seal lip to get even more unpredictable wear if the bearing is still rotating. If the negative pressure gets large enough, then the seal and seal lip will bend enough to leak air and contaminants into the bearing space. Degradation of the sealing function due to unpredictable uneven wear of the seal lip will lead to even more water inflow into the bearing space that will accelerated deterioration of the lubricant in the bearing space.

U.S. Pat. No. 6,457,870 addresses the problem of air pressure differences across a seal and solves this by having vents with valves at a position which is hardly exposed to external water or the like. There is still room for improvements.

BRIEF SUMMARY OF THE INVENTION

An object of the invention is to define a seal for a sealed enclosure capable of keeping an air pressure balance between an internal space within the sealed enclosure and an external space outside the sealed enclosure in such a way that water ingress is predictably hindered.

The aforementioned object is achieved according to the invention by a seal for an enclosure, where the seal when in use enables the enclosure to be sealed and enables it to keep an air pressure balance between an internal space within the enclosure and an external space outside the enclosure in a way that water ingress into the enclosure is hindered in a predictable manner. The seal comprises a seal body having two side surfaces, a first side surface facing the internal space when in use, and a second side surface facing away from the internal space when in use. The seal body is made from an elastomeric material. The seal further comprises a seal lip attached to or being part of the seal body. According to the invention the seal further comprises at least one small diameter hollow tube with two ends. The at least one small diameter hollow tube comprises at least an inner surface being hydrophobic, oleophobic or omniphobic thereby hindering water passage through it in a predictable manner, while allowing air to flow through the at least one small diameter hollow tube if there is an air pressure difference between its two ends. The at least one small diameter hollow tube is mounted in the seal body between the first and the second surface and is at least long enough so that it at least reaches the first surface and the second surface. When the seal is in use it is mounted in the enclosure between the internal space and the external space with the seal lip against a counterface to thereby make the enclosure sealed.

The at least one small diameter hollow tube can suitably be substantially straight in some embodiments. In other embodiments the at least one small diameter hollow tube is curved at the end coming out of the second side surface of the seal body and/or curved at the end coming out of the first side surface of the seal body. In other embodiments the at least one small diameter hollow tube is formed at least partly as a helix. Adding curves or a part or complete helix extends an inner length of the at least one small diameter hollow tube and will reduce the risk of small particle contaminants to enter and go through the tube.

In some embodiments the at least one small diameter hollow tube (straight, curved, helix) comprises at least one collar. A diameter of the collar can suitably be from 2 to 12 mm, more suitably from 3 mm to 6 mm, larger than an outer diameter of the at least one small diameter hollow tube.

In some embodiments the at least one small diameter hollow tube is a carrier tube that is at least coated on the inner surface with a hydrophobic, oleophobic or omniphobic coating. Suitably the carrier tube is completely coated with a hydrophobic, oleophobic or omniphobic coating.

In other embodiments the at least one small diameter hollow tube is made from a hydrophobic, oleophobic or omniphobic material.

Preferably an inner diameter of the at least one small diameter hollow tube is from 0.05 mm to 5 mm, suitably from 0.1 mm to 3 mm and is advantageously in the order of 0.2 mm to 1 mm.

The different additional enhancements of the seal according to the invention can be combined in any desired manner as long as no conflicting features are combined.

Other advantages of this invention will become apparent from the detailed description.

BRIEF DESCRIPTION OF THE SEVERAL VIEWS OF THE DRAWING

The invention will now be described in more detail for explanatory, and in no sense limiting, purposes, with reference to the following figures, in which.

DETAILED DESCRIPTION OF THE INVENTION

In order to clarify the method and device according to the invention, some examples of its use will now be described in connection with FIGS. 1 to 5.

Figure 1:
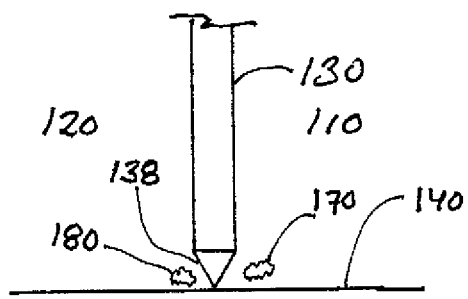
FIG. 1 illustrates a detail of a seal assembly.

FIG. 1 illustrates a detail of a conventional seal assembly as commonly used in hermetically sealed enclosures, such as a hermetically sealed bearing, comprising a seal body 130 with a seal lip 138 that in use presses onto a counterface 140. It is defined what is an external side 120 of the seal assembly, where there can be water and other contamination 180 that it is desirable to keep away from the internal side 110 of the seal assembly, where, in bearing applications, there will most likely be oil or grease 170 for lubrication of one or more bearings.

The seal assembly is devised on its own or in combination with one more other seal assemblies to create a hermetically sealed internal space on the internal side 110 of the seal assembly. If the air pressure rises in the internal side/space 110, due to for example a rising temperature within the internal side/space 110, then an internal air pressure will be greater than an external air pressure, there is no balance between the two air pressures. This will result in forces/stresses being exerted on both the seal body 130 and the seal lip 138. If the air pressure difference is great enough then the seal body 130 and the seal lip 138 will bend towards the external/outer side 120 so much that there will be air leakage into the external side 120. This air leakage can also press with it grease and oil 170, diminishing available lubrication in the internal side/space 110. If this happens enough times, then the supply of lubrication will be depleted in the internal side/space 110, which would eventually lead to a breakdown. The seal lip 138 will also be worn in ways that are not anticipated, possibly causing premature breakdown of the seal lip 138.

If after a high internal 110 air pressure leading to escape of air, the internal air cools down, then the internal air pressure goes down. Since there is some air lost from this hermetically sealed inner space, when the air inside reaches the same temperature as that of the external 120 air, then there will be a negative air pressure internally 110 in comparison to the external 120 air pressure. Another air pressure imbalance resulting in a reverse situation where there is a higher external 120 air pressure than the internal 110 air pressure, exerting a force/pressure on the seal body 130 and the seal lip to bend inwards. If this imbalance is big enough there can be an ingress of water and other contamination 180 into the hermetically sealed enclosure. If water enters, it will deteriorate any oil or grease 170 present.

Figure 2:
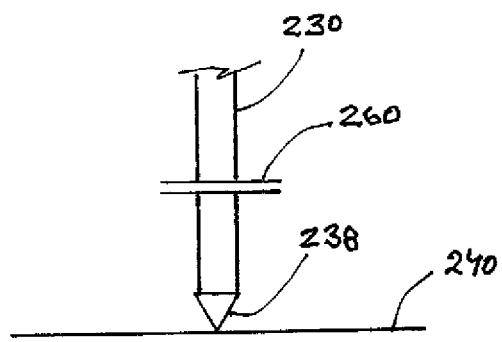
FIG. 2 illustrates a detail of a seal assembly according to a first basic embodiment of the invention.

There is thus a need to equalize an air pressure of a hermetically sealed enclosure with an air pressure of a space outside the hermetically sealed space. FIG. 2 illustrates a detail of a seal assembly according to a first basic embodiment of the invention comprising a seal body 230 with a seal lip 238 that in use presses onto a counterface 240. Through the seal body 230 there is additionally at least one small diameter tube 260 extending at least through the seal body 230, with at least an inner surface being hydrophobic, oleophobic or omniphobic. The enclosure will thus no longer be hermetically sealed, but will keep the positive characteristics and get rid of the negative characteristic of a possible air pressure imbalance.

Figure 3:
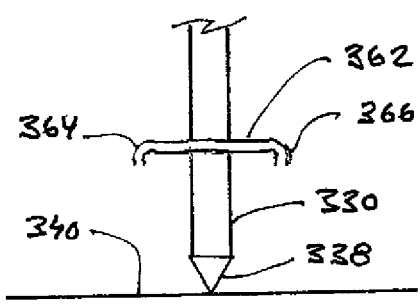
FIG. 3 illustrates a detail of a seal assembly according to a second embodiment of the invention.

FIG. 3 illustrates a detail of a seal assembly according to a second embodiment of the invention comprising a seal body 330 with a seal lip 338 that in use presses onto a counterface 340. Through the seal body 330 there is additionally at least one small diameter tube 362 extending at least through the seal body 330, with at least an inner surface being hydrophobic, oleophobic or omniphobic. The small diameter tube 362 has a first bend 364 on one side and a second bend 366 on the other side. This will make it more difficult for small particles to enter and pass through the tube 362.

Figure 4:
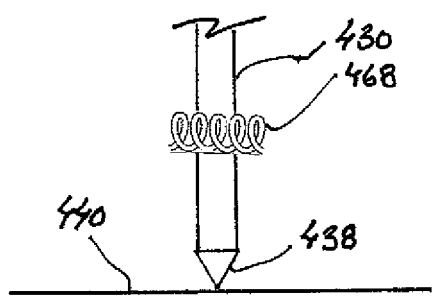
FIG. 4 illustrates a detail of a seal assembly according to a third embodiment of the invention.

FIG. 4 illustrates a detail of a seal assembly according to a third embodiment of the invention comprising a seal body 430 with a seal lip 438 that in use presses onto a counterface 440. Through the seal body 430 there is additionally at least one small diameter tube 468 extending at least through the seal body 430, with at least an inner surface being hydrophobic, oleophobic or omniphobic. In this embodiment the small diameter tube 468 is formed as a helix, making it even more difficult for small particles to pass through. Such a tube could be screwed into the seal body.

Figure 5:
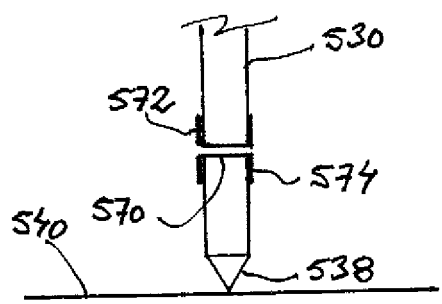
FIG. 5 illustrates a detail of a seal assembly according to a fourth embodiment of the invention.

FIG. 5 illustrates a detail of a seal assembly according to a fourth embodiment of the invention comprising a seal body 530 with a seal lip 538 that in use presses onto a counterface 540. Through the seal body 530 there is additionally at least one small diameter tube 570 extending at least through the seal body 530, with at least an inner surface being hydrophobic, oleophobic or omniphobic. In this embodiment the small diameter tube 570 comprises at least one collar on one side of the seal body 530. The at least one collar is attached to the small diameter tube 570 in such a way that a back side of the collar in question presses against the seal body 530. The small diameter tube 570 can be more or less flush with the collar or extend further. Suitably there is one collar on each side of the seal body 530, each collar 572, 574 being attached to the small diameter tube 570 in such a way that the back side of each collar presses against the seal body 530. At least a front side of each collar has advantageously a surface that is either hydrophobic, oleophobic or omniphobic. The collars will ensure that water and possibly oil/grease are kept away from the entrances of the small diameter tube 570 as much as possible.

The collared small diameter tube 570 embodiment can be mounted on the seal body 530 like a hollow rivet. The diameter of the collars 572. 574 are suitably 2 mm to 12 mm larger than an outer diameter of the small diameter tube 570, more suitably 3 mm to 6 mm larger.

A seal according to the invention allows air to flow through at least one small diameter tube, but will stop water ingress and if the inner surface of the tube is oleophobic or omniphobic, oil/grease will not be able to leak out. By using a seal according to the invention in an enclosure that was to be hermetically sealed, the enclosure will no longer be hermetically sealed, but will keep the positive characteristics of a hermetically sealed enclosure and get rid of the negative characteristics of a hermetically sealed enclosure.

A small diameter tube can in some embodiments be made as a carrier tube that is then at least coated on the inner side with a hydrophobic, oleophobic or omniphobic coating. In some embodiments the carrier tube is also coated on the external surface, this can improve the functionality by not having moisture or water wet on the outside of the tube. The carrier tube can be made from any suitable material, such as metal or plastic.

In other embodiment a small diameter tube be made of a hydrophobic, oleophobic or omniphobic material, it would thus have the correct characteristics on both inner and outer surfaces, and would be advantageous for the smaller diameters as it could be difficult to coat an inner surface of a very small diameter tube.

The number of necessary tubes will depend on the inner diameter of the tubes, a maximum allowed airflow rate through the tubes, the size of the sealed enclosure, an acceptable air pressure difference between that of the enclosure and that of the space external to the enclosure, and a maximum rate of change of air pressure, both within the enclosure and of the space external to the enclosure.

The suitable diameter of a small diameter tube will depend on the geometry of the tube itself and how hydrophobic the inner surface of the tube is. The more hydrophobic the inner surface of the tube is, the larger the diameter can be. A suitable inner diameter is in most cases from 0.05 mm to 5 mm more suitably from 0.1 mm to 3 mm and is preferably in the order of 0.2 mm to 1 mm. Consideration must also be taken concerning other contaminants that might enter through the tube, such as dirt, if the inner diameter of the tube is on the larger range. One way of improving this is by having not a straight tube, but a tube with curves and bends, this makes it more difficult for other types of contaminants such as sand, to get through the tub, and will still allow an airflow.

In the above described embodiments a small diameter tube, with at least an inner surface being hydrophobic, oleophobic or omniphobic, is located in a seal body. The small diameter tube can alternatively be mounted in another part of a sealed space, such as a housing wall.

The invention defines a seal that enables an enclosure that is sealed when in use, to keep an air pressure balance when in use between an internal space within the enclosure and an external space outside the enclosure in such a way that water ingress into the enclosure is hindered in a predictable manner. This is accomplished according to the invention by a seal having between its two sides at least one small diameter hollow tube with at least an inner surface being hydrophobic, oleophobic or omniphobic. When in use the seal is mounted in the enclosure between the inner and outer space against a counterface to thereby make the enclosure sealed. To further avoid small particle contaminants to enter and go through the tube, it is preferable to have a small diameter tube with curves and bends, and it will still allow an airflow through it if there is an air pressure imbalance. The invention is not restricted to the above-described embodiments, but may be varied within the scope of the following claims.

REFERENCE NUMERAL LISTING

FIG. 1 illustrates a detail of a seal assembly:
110 Internal,
120 External,
130 Seal body,
138 Seal lip,
140 Counterface,
170 Oil, grease,
180 Water, contaminants.
FIG. 2 illustrates a detail of a seal assembly according to a first basic embodiment of the invention:
230 Seal body,
238 Seal lip,
240 Counterface,
260 Small diameter tube extending at least through the seal body, with at least an inner surface being hydrophobic or omniphobic.
FIG. 3 illustrates a detail of a seal assembly according to a second embodiment of the invention:
330 Seal body,
338 Seal lip,
340 Counterface,
362 Small diameter tube, at least inner surface being hydrophobic or omniphobic,
364 First bend of small diameter tube on one side,
366 Second bend of small diameter tube on the other side.
FIG. 4 illustrates a detail of a seal assembly according to a third embodiment of the invention:
430 Seal body,
438 Seal lip,
440 Counterface,
468 Helix small diameter tube, at least inner surface being hydrophobic or omniphobic.
FIG. 5 illustrates a detail of a seal assembly according to a fourth embodiment of the invention:
530 Seal body,
538 Seal lip,
540 Counterface,
570 Small diameter tube that can optionally be collared, at least inner surface of tube being hydrophobic or omniphobic,
572 First optional tube collar, outer surface being hydrophobic or omniphobic,
574 Second optional tube collar, outer surface being hydrophobic or omniphobic.

What is claimed is:

1. A seal for an enclosure, the seal enabling the enclosure to be sealed and to maintain an air pressure balance between an internal space within the enclosure and an external space outside the enclosure in a way that water ingress into the enclosure is hindered in a predictable manner, the seal comprising:
a seal body having two side surfaces, a first side surface facing the internal space when in use, and a second side surface facing away from the internal space when in use, the seal body being made from an elastomeric material;
a seal lip attached to or being part of the seal body; and
at least one small diameter hollow tube with two ends, the at least one small diameter hollow tube further comprising at least an inner surface being hydrophobic, oleophobic or omniphobic thereby hindering water passage through it in a predictable manner, while allowing air to flow through the at least one small diameter hollow tube if there is an air pressure difference between its two ends; wherein
the at least one small diameter hollow tube is mounted in the seal body between the first and the second surface and being at least long enough so that it at least reaches the first surface and the second surface, so that when the seal is mounted in the enclosure between the internal and the external space with the seal lip against a counterface the enclosure is sealed.

2. The seal according to claim 1, wherein the at least one small diameter hollow tube is substantially straight.

3. The seal according to claim 1, wherein the at least one small diameter hollow tube is curved at the end coming out of the second side surface of the seal body to thereby extend an inner length of the at least one small diameter hollow tube and to reduce the risk of small particle contaminants to enter and go through it.

4. The seal according to claim 1, wherein the at least one small diameter hollow tube is curved at the end coming out of the first side surface of the seal body to thereby extend an inner length of the at least one small diameter hollow tube and to reduce the risk of small particle contaminants to enter and go through it.

5. The seal according to claim 1, wherein the at least one small diameter hollow tube is formed at least partly as a helix to thereby extend an inner length of the at least one small diameter hollow tube and to reduce the risk of small particle contaminants to enter and go through it.

6. The seal according to claim 1, wherein the at least one small diameter hollow tube comprises at least one collar, and wherein a diameter of the collar is from 2 to 12 mm larger than an outer diameter of the at least one small diameter hollow tube.

7. The seal according to claim 1, wherein the at least one small diameter hollow tube is a carrier tube that is at least coated on the inner surface with a hydrophobic, oleophobic or omniphobic coating.

8. The seal according to claim 7, wherein the carrier tube is completely coated with a hydrophobic, oleophobic or omniphobic coating.

9. The seal according to claim 1, wherein the at least one small diameter hollow tube is made from a hydrophobic, oleophobic or omniphobic material.

10. The seal according to claim 1, wherein an inner diameter of the at least one small diameter hollow tube is from 0.05 mm to 5 mm.

* * * * *